United States Patent

Ishihara et al.

[11] Patent Number: 5,878,576
[45] Date of Patent: Mar. 9, 1999

[54] MASTER CYLINDER

[75] Inventors: Kimio Ishihara; Toshiaki Satoh, both of Higashimatsuyama, Japan

[73] Assignee: Jidosha Kiki Co., Ltd., Tokyo, Japan

[21] Appl. No.: 994,162

[22] Filed: Dec. 19, 1997

[30] Foreign Application Priority Data

Dec. 25, 1996 [JP] Japan .................................. 8-344381

[51] Int. Cl.$^6$ .............................................. B60T 11/20
[52] U.S. Cl. ............................................................ 60/562
[58] Field of Search ........................... 60/562; 92/130 D, 92/135

[56] References Cited

U.S. PATENT DOCUMENTS

| 3,423,940 | 1/1969 | Brand | 60/562 |
| 3,555,822 | 1/1971 | Rivetti | 60/562 |
| 4,604,866 | 8/1986 | Gaiser | 60/562 |
| 5,063,743 | 11/1991 | Mori et al. | 60/562 |

FOREIGN PATENT DOCUMENTS 08187081  7/1996  Japan .

*Primary Examiner*—F. Daniel Lopez
*Attorney, Agent, or Firm*—Alston & Bird LLP

[57] ABSTRACT

The present invention discloses a master cylinder MC, which comprises a body section 2, a cap 3, a cylinder housing 1 composed of the body section 2 and the cap 3, a sleeve 8 fitted in the cylinder housing 1, primary and secondary pistons 4 and 5 provided to be guided by the sleeve 8 and slid, first and second pressure chambers 9 and 10 and spring mechanisms 11 and 12 respectively disposed in the first and second pressure chambers for pressing the primary and secondary pistons 4 and 5 in returning directions. In the peripheral portion 17*a* of the spring retainer 17 of the spring mechanism 11 for pressing the primary piston 4, hook sections 17*e* are formed by protruding a plurality of portions 17*d* outward in an axial direction and then folding the tip of each of the protruded portions in a piston axial direction so as to hook the same in the outer peripheral surface of the sleeve 8. Thus, even if an excessive pulling-out force is applied to the primary piston, easy pulling-out of the primary piston can be prevented without deforming the spring retainer.

2 Claims, 5 Drawing Sheets

MASTER CYLINDER

BACKGROUND OF THE INVENTION

1. Field of the Invention

The present invention relates to the improvement of a master cylinder used for various braking devices, and so on, of an automobile.

2. Description of the Related Art

As a master cylinder of the kind relating to the present invention, there is available a tandem brake master cylinder MC like that shown in FIG. 5. This tandem brake master cylinder MC is loaded in front of a not-shown brake power assist (brake booster) MV. The cylinder housing 1 of the master cylinder MC is composed of a body section 2 having an opening part in one end, and a cap 3 connected (prevented from being pulled out by a retainer) to the opening part of the body section 2.

A sleeve 8 is fitted in the cylinder housing 1. A primary piston 4 and a secondary piston 5 are inserted through the cap 3 and freely slidably disposed to be guided and supported by a piston guide section 3a formed in the cap 3 and the sleeve 8.

Inside the cylinder housing 1, a first pressure chamber 9 is formed by the primary piston 4, the secondary piston 5 and the cap 3. A second pressure chamber 10 is formed by the secondary piston 5 and the inner wall surface of the body section 2.

Recessed sections 4a and 5a opened in tip sides are respectively formed in the primary piston 4 and the secondary piston 5. Small holes 4b and 5b are respectively provided in peripheral walls forming the recessed sections 4a and 5a. In a brake releasing position, a replenish liquid passage is formed to be leading from an oil reservoir 23 to the first and second pressure chambers 9 and 10.

Spring mechanisms 11 and 12 are respectively provided in the first and second pressure chambers 9 and 10. The spring mechanisms 11 and 12 are disposed respectively between the recessed section 4a of the primary piston 4 and the secondary piston 5 and between the recessed section 5a of the secondary piston 5 and the inner wall surface of the body section 2. These spring mechanisms 11 and 12 press the primary piston 4 and the secondary piston 5 respectively in returning directions.

The spring mechanism 11 is composed of a return spring 15, a guide pin 16 having a large head portion 16a, a spring retainer 17 shaped like a derby hat (alternatively, shaped like a flange cylinder), and a guide pin fixing member 18. The return spring 15 is provided to be contracted between the peripheral portion of the guide pin fixing member 18 and the peripheral flange portion 17a of the spring retainer 17. One end of the return spring 15 is fitted in an expanded diameter portion formed in the bottom surface of the recessed section 4a of the primary piston 4. The guide pin 16 is disposed so as to be away from the bottom surface of the recessed section 4a by a predetermined length and protruded in a piston axial direction. The guide pin fixing member 18 is fixed in a fixing groove formed in the end part of the guide pin 16. The spring retainer 17 includes a hole 17b provided in the a top part of its derby hat shape. This hole 17b is freely slid to the guide pin 16 inserted into the hole 17b within the range of a predetermined stroke (range slightly exceeding the returning limit of the primary piston 4) and engaged with its large head portion 16a. The spring mechanism 12 includes only a return spring.

With the master cylinder MC thus constructed, when the primary piston 4 and the secondary piston 5 are respectively pushed into the first and second pressure chambers 9 and 10 against the pressing forces of the spring mechanisms 11 and 12 in a left direction in the drawing, liquid pressure in each of the pressure chambers 9 and 10 is increased and hydraulic liquid is forcibly fed from feed ports 13 and 14 to a not-shown braking system.

As shown in FIGS. 6(a) and 6(b), in the peripheral portion 17a of the spring retainer 17 of the spring mechanism 11 included in the master cylinder MC, there are integrally formed a plurality (e.g., four) of tip portions 17c which are protruded outward in a radial direction. A wide guide groove 20 having a constant width is provided in the sleeve 8. This guide groove 20 is formed in an axial direction for inserting and engaging the tip portion 17c so as to penetrate the inner and outer peripheral surfaces of the sleeve 8. The guide groove 20 includes a stopping section 20a formed in a position slightly exceeding the returning limit of the primary piston 4 from the end of the sleeve 8. The tip portion 17c is brought into contact with the stopping section 20a and stopped therein.

According to the above-described master cylinder MC relating to the present invention, during brake operation, the deformation of the sleeve 8 can be prevented, machining of the guide groove 20 can be facilitated, and an ineffective stroke can be freely set in combination with the brake power assist (brake booster) MV without regulating the returning limits of the primary and secondary pistons 4 and 5. [See Japanese Patent Application No. 8-187081 (No. 187081/1996)].

However, there are problems inherent in the master cylinder MC. One problem is concerned with the spring retainer 17 for preventing the pulling-out of the primary piston 4. Specifically, when the primary piston 4 is strongly pulled, the tip portion 17c formed in the radial direction of the peripheral portion 17a of the spring retainer 17 is deformed inward and bent. Consequently, the primary piston 4 may be pulled out.

Another problem is concerned with the formation of a low projecting section in the rear end surface of the secondary piston 5, which is used for positioning the spring retainer 17. Since a portion brought into contact with the spring retainer 17 is only formed to be tapered, the deformation of the tip portion 17c cannot be prevented.

SUMMARY OF THE INVENTION

The present invention was made in order to solve the above-discussed problems. It is an object of the invention to provide a master cylinder which can prevent easy pulling-out of a primary piston without deforming a spring retainer even if an excessive pulling-out force is applied to the primary piston.

In order to achieve the objective, according to the present invention, the master cylinder comprises a body section having an opening part in one end, a cap connected to the opening part of the body section, a cylinder housing composed of the body section and the cap, a sleeve fitted through the cap in the housing, primary and secondary pistons slidably disposed in the housing, guided by the sleeve, a first pressure chamber formed by the primary and secondary pistons and the cap, a second pressure chamber formed by the secondary piston and the body section, spring mechanisms disposed respectively in the first and second pressure chambers for pressing the primary and secondary pistons in returning directions. The spring mechanism disposed in the first pressure chamber includes a nearly cylindrical spring retainer brought into contact with the rear end surface of the secondary piston, a guide pin inserted into the spring retainer and fixed in the bottom surface of a recessed section formed in the tip side of the primary piston, the head portion of the guide pin being locked in the retainer, and a return spring provided to be contracted between the spring retainer and the primary piston.

The master cylinder thus constructed is characterized as follows.

(1) A hook section is formed in the peripheral portion of the spring retainer by forming a projecting section protruded outward in a radial direction and then folding the tip of the same in a piston axial direction so as to hook the tip in the outer peripheral surface of the sleeve. In the sleeve, a guide groove penetrating its inner and outer peripheral surfaces is formed in the axial direction, through which the hook section is inserted and engaged therewith, and a stopping section for contacting the hook section is formed in a position slightly exceeding its returning limit.

(2) A tip section protruded outward in a radial direction is formed in the peripheral portion of the spring retainer. In the sleeve, a guide groove penetrating its inner and outer surfaces is formed in an axial direction, through which the tip section is inserted and engaged therewith, and a stopping section for contacting the tip side is formed in a position slightly exceeding its returning limit. A columnar or cylindrical projecting section for fitting the inner peripheral surface of the spring retainer with play is formed in the rear end surface of the secondary piston.

With the master cylinder of the present invention, since the hook section is formed by folding the portion of the spring retainer protruded outward in the radial direction and the hook section is hooked in the outer peripheral surface of the sleeve, easy pulling-out of the primary piston can be prevented.

Furthermore, since the columnar or cylindrical projecting section for fitting the inner peripheral surface of the spring retainer with play is formed in the rear end surface of the secondary piston, even if an excessive pulling-out force is applied to the primary piston, easy pulling-out of the same can be prevented without deforming the spring retainer.

DETAILED DESCRIPTION OF THE PREFERRED EMBODIMENTS

In this section, the preferred embodiments of the present invention will be described in detail with reference to the accompanying drawings.
(FIRST EMBODIMENT)

Figure 1:
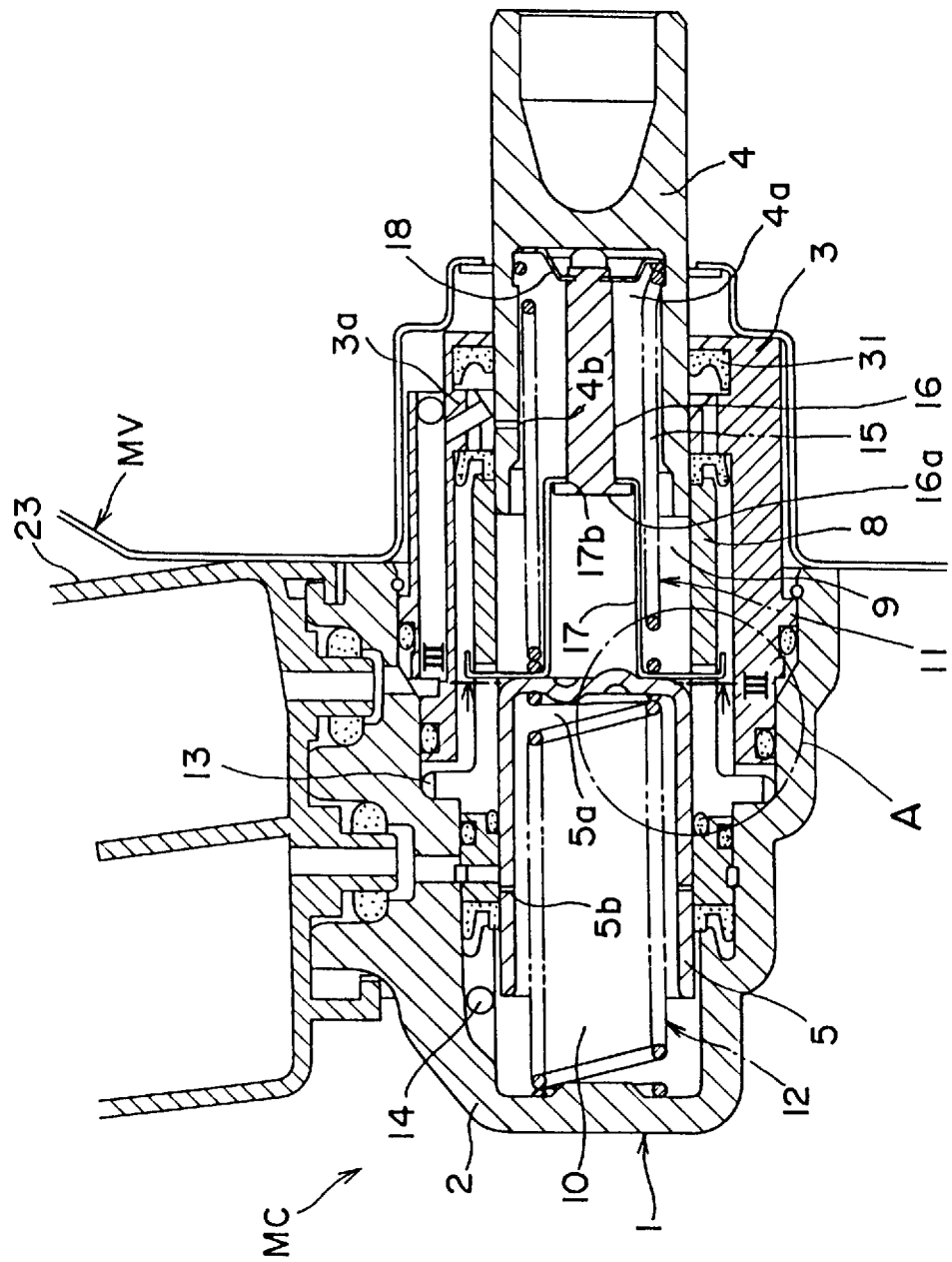
FIG. 1 is a longitudinal sectional view showing a first embodiment of a master cylinder of the present invention.
Figure 2A:
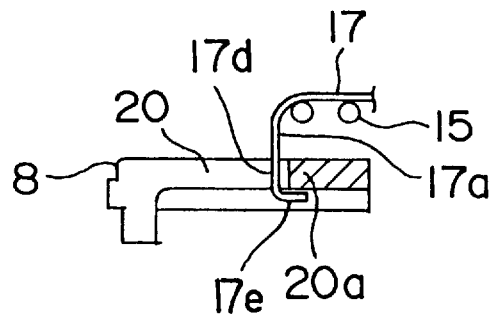
FIGS. 2(a) and 2(b) are expanded views each of an A portion of FIG. 1, specifically FIG. 2(a) being its sectional view and FIG. 2(b) being its bottom surface view.
Figure 2B:
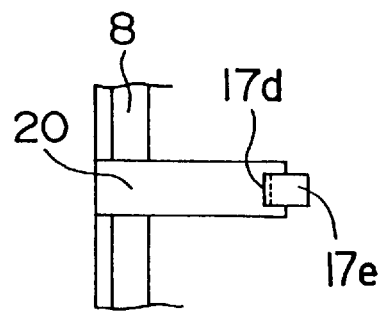

FIGS. 1 and 2 each illustrate the first embodiment of the master cylinder of the present invention. Specifically, FIG. 1 is a longitudinal sectional view showing the master cylinder. FIG. 2 is an expanded view showing the A portion of FIG. 1.

Figure 5:
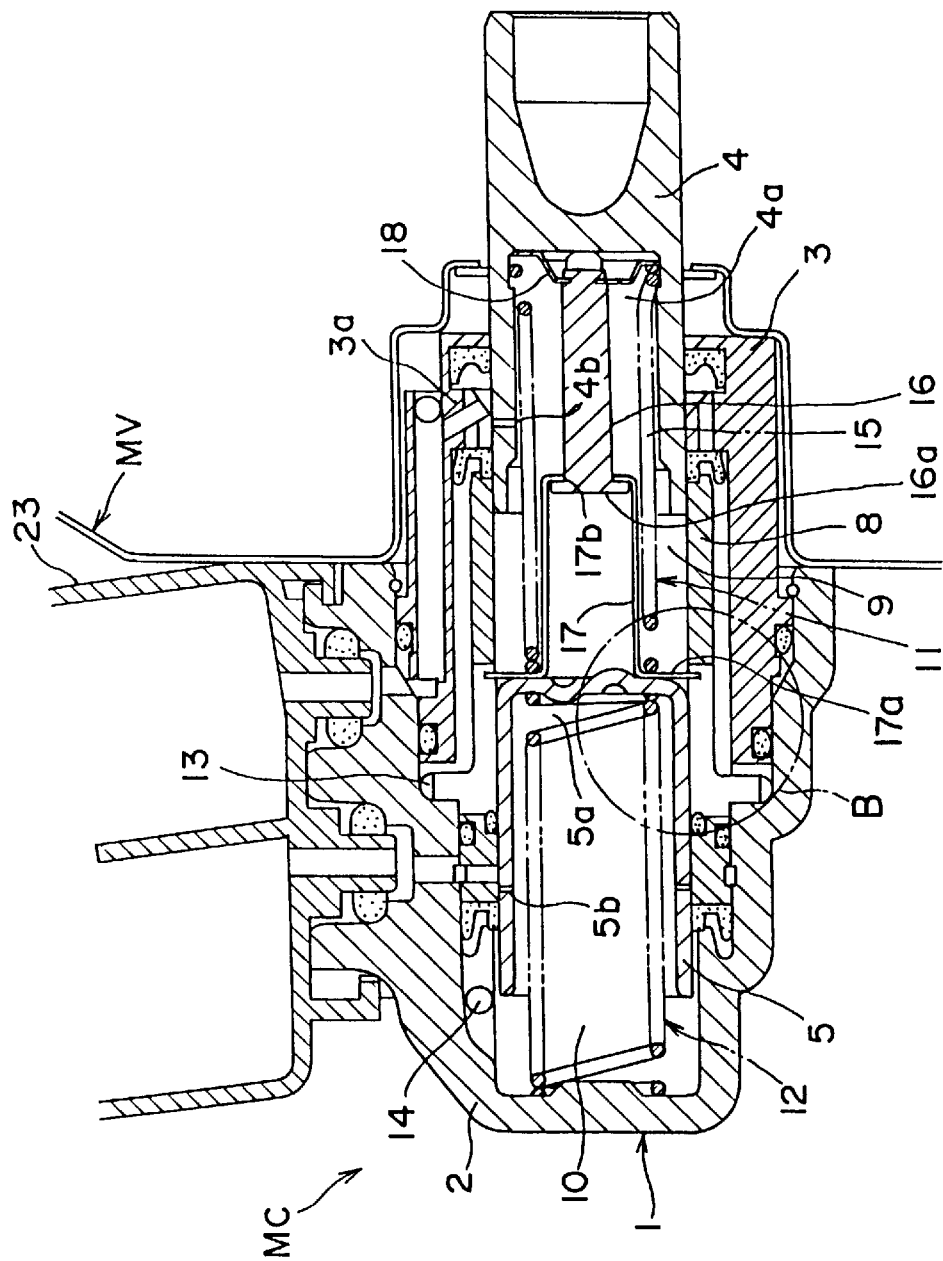
FIG. 5 is a longitudinal sectional view showing a master cylinder relating to the present invention.
Figure 6A:
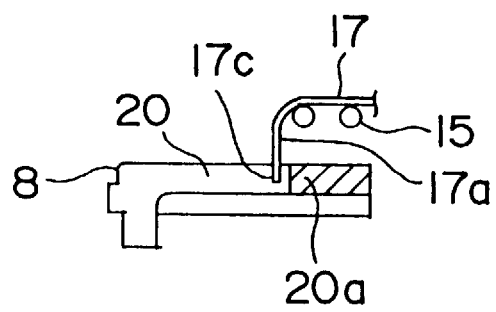
FIGS. 6(a) and 6(b) are expanded views each of a B portion of FIG. 5, specifically FIG. 6(a) being its sectional view and FIG. 6(b) being its bottom surface view.
Figure 6B:
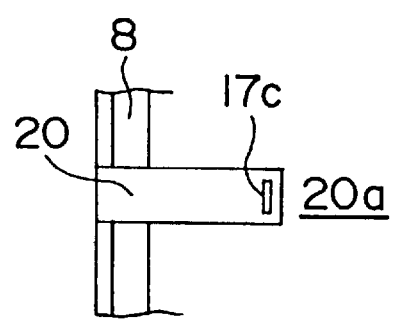

In FIGS. 1 and 2, like reference numerals are used to denote sections similar to those shown in FIGS. 5 and 6, and description thereof will be omitted.

In FIGS. 1 and 2, a plurality (four in the embodiment) of projecting sections 17d protruded outward in a radial direction are integrally formed in the peripheral portion 17a of a spring retainer 17. Hook sections 17e are formed by folding the tips of the projecting sections 17d in a piston axial direction in the spring retainer 17 side so as to hook the tips of the same in the outer peripheral surface of a sleeve 8.

Thus, even if an excessive force is applied to a primary piston 4, for example if the primary piston 4 is strongly pulled, since the hook sections 17e are hooked in the outer peripheral surface of the sleeve 8, easy pulling-out of the primary piston 4 can be prevented without deforming the spring retainer 17.

In the sleeve 8, a plurality of constant width guide grooves 20 wider than the projecting sections 17d are formed in an axial direction for inserting and engaging the projecting sections 17d and the hook sections 17e. These guide grooves 20 penetrate the inner and outer surfaces of the sleeve 8. In each of the guide groove 20, a stopping section 20a for contacting and stopping the projecting section 17d is formed in a position slightly exceeding the returning limit of the primary piston 4 from the end of the sleeve 8.

Instead of the constant width guide grooves 20 trapezoidal guide grooves which wide in the end of the sleeve 8 and narrow in the stopping sections 20a may be formed.

Figure 3:
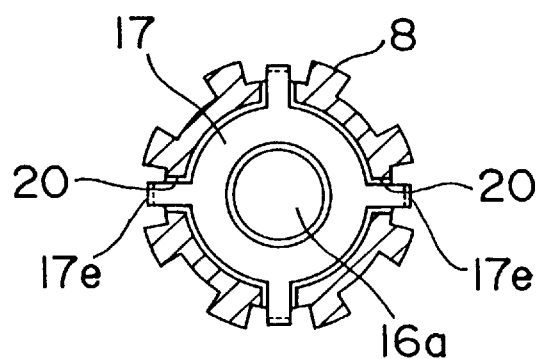
FIG. 3 is a perspective sectional view taken along a line III—III of FIG. 1.

As shown in FIG. 3, the guide grooves 20 formed in the sleeve 8 penetrate the inner and outer peripheral surfaces of the same and are wider than the projecting sections 17d and the hook sections 17e. Accordingly, even if the projecting sections 17d are inserting along the guide grooves 20, no interference occurs in the distribution of hydraulic oil. Sliding of the projecting sections 17d along the guide grooves 20 produces little wear in the sleeve 8. Further, no interference occurs in the movement of the spring retainer 17 following the reciprocation of the primary piston 4.
(SECOND EMBODIMENT)

Figure 4:
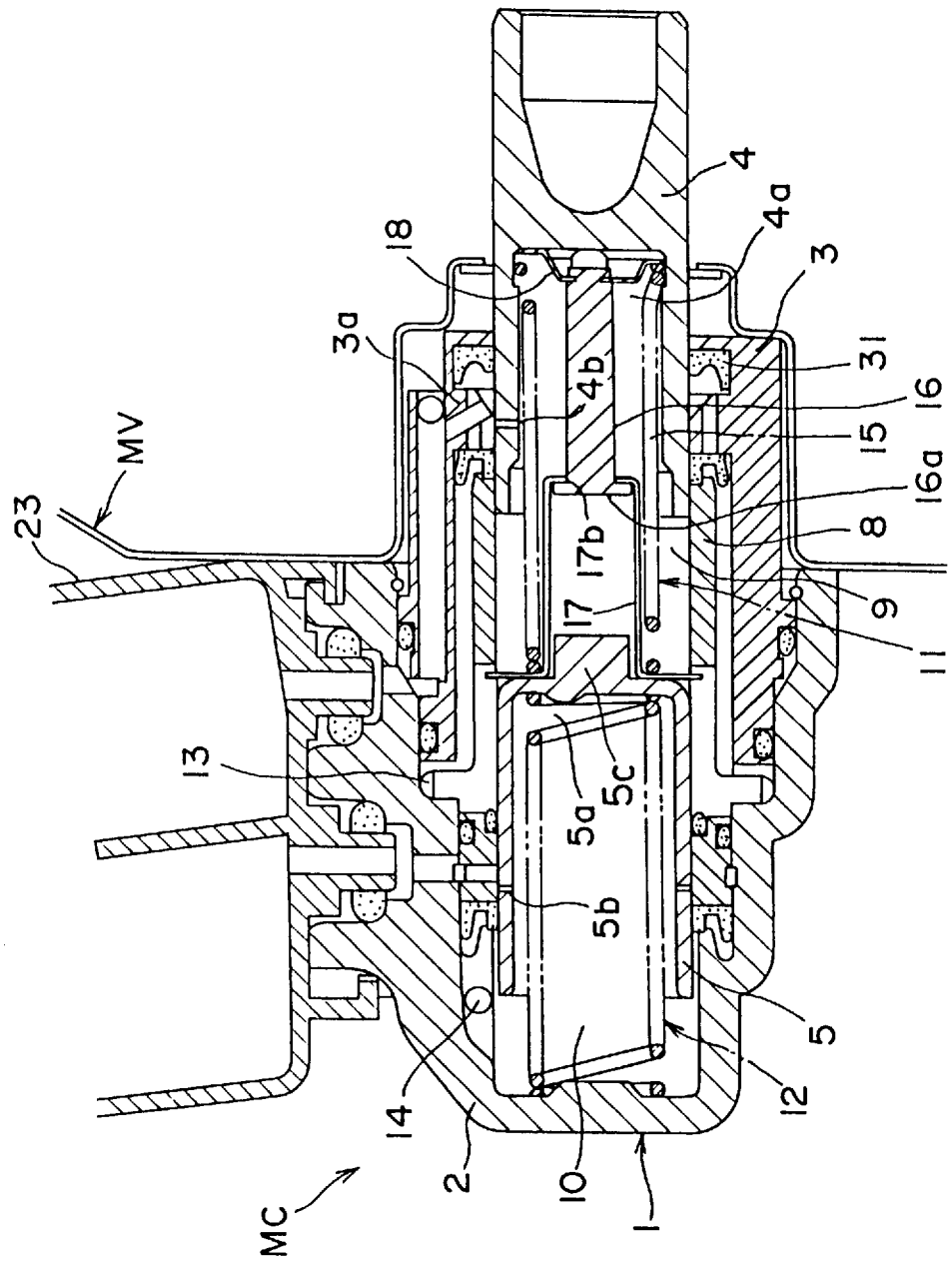
FIG. 4 is a longitudinal sectional view showing a second embodiment of a master cylinder of the present invention.

FIG. 4 is a longitudinal sectional view showing the second embodiment of the master cylinder of the present invention. Like reference numerals are used for sections similar to those shown in FIG. 5, and description thereof will be omitted.

In FIG. 4, a columnar or cylindrical (columnar in FIG. 4) projecting section 5c is formed in the rear end surface of a secondary piston 5 toward a primary piston 4. The outer peripheral surface of the projecting section 5c and the inner peripheral surface of a spring retainer 17 are fitted together with play. The projecting section 5c is formed in the rear end surface of the secondary piston 5 nearly vertically from the base portion thereof. Preferably, its height should be set such that even if an excessive force is applied to a projecting section 17d formed in the peripheral portion 17a of the spring retainer 17, for example if an excessive pulling-out force is applied to the primary piston 4, no deformation can occur in the spring retainer 17 or no interference can occur in the normal stroke of the primary piston 4.

If the projecting section 5c is formed to be cylindrical, the problem of its height limitation (height limitation to prevent interference with the normal stroke of the primary piston 4) can be solved by forming its cylindrical inner diameter portion to have an outer diameter in which the large head section 16a of the guide pin 16 of a spring mechanism 11 can be fitted with play.

Thus, it can be understood that by forming the projecting section 5c in the rear end surface of the secondary piston 5, the deformation of the spring retainer 17 can be prevented, the inner peripheral surface thereof being fitted with play to the projecting section 5c. Moreover, even if an excessive pulling-out force is applied to the primary piston 4, easy pulling-out of the primary piston 4 can be prevented.

Needless to say, the first and second embodiments can be practiced simultaneously.

The technical teachings of the present invention should not be limited to the above-described embodiments. Other modes having like functions can be employed, and various modifications and additions can be made to the technical forms of the invention within the scope of the above-described constitution.

As apparent from the foregoing description, the master cylinder of the present invention is effective in the following points.

According to the first embodiment, the hook sections are formed in the peripheral portion of the spring retainer by forming the portion protruded outward in the radial direction and then folding the tips thereof in the piston axial direction so as to hook the same in the outer peripheral surface of the sleeve. In the sleeve, the guide grooves penetrating the inner and outer surfaces of the sleeve are formed in the axial direction for inserting and engaging the hook sections. Also, the stopping section for contacting the hook section is formed in the position slightly exceeding the returning limit. Therefore, even if the primary piston is strongly pulled, easy pulling-out of the primary piston can be prevented without deforming the spring retainer.

According to the second embodiment, the tip sections protruded outward in the radial direction are formed in the peripheral portion of the spring retainer. In the sleeve, the guide grooves penetrating the inner and outer surfaces of the sleeve are formed in the axial direction for inserting and engaging the tip sections. Also, the stopping section for contacting the tip section is formed in the position slightly exceeding the returning limit. In the rear end surface of the secondary piston, the columnar or cylindrical projecting section is formed such that the inner peripheral surface of the spring retainer can be fitted thereto with play. Therefore, even if an excessive pulling-out force is applied to the primary piston, easy pulling-out of the primary piston can be prevented without deforming the spring retainer.

We claim:

1. A master cylinder comprising:

a body section having an opening part in one end;

a cap connected to said opening part of said body section;

a cylinder housing composed of said body section and said cap;

a sleeve inserted in said cap and fitted in said cylinder housing;

primary and secondary pistons slidably disposed to be guided by said sleeve;

a first pressure chamber formed by said primary and secondary piston and said cap;

a second pressure chamber formed by said secondary piston and said body section; and spring mechanisms for pressing each of said primary and secondary pistons in returning directions respectively disposed in said first and second pressure chambers, said spring mechanism disposed in said first pressure chamber including a substantially cylindrical spring retainer brought into contact with a rear end surface of said secondary piston, a guide pin inserted in said spring retainer and having a portion engaged with said primary piston and an opposite head portion being locked in said spring retainer, and a return spring provided to be contracted between said spring retainer and said primary piston, wherein a hook section is formed in a peripheral portion of said spring retainer by forming a portion protruded in a radial direction and then folding a tip of said portion in a piston axial direction so as to hook said tip in an outer peripheral surface of said sleeve, and wherein said sleeve defines at least one guide groove which is formed in inner and outer peripheral surfaces of said sleeve in an axial direction for receiving and engaging said hook section and which groove also has a stopping section for contacting said hook section in a position slightly exceeding a predetermined returning limit of said primary piston.

2. A master cylinder comprising:

a body section having an opening part in one end;

a cap connected to said opening part of said body section;

a cylinder housing composed of said body section and said cap;

a sleeve inserted in said cap and fitted in said cylinder housing;

primary and secondary pistons slidably disposed to be guided by said sleeve;

a first pressure chamber formed by said primary and secondary pistons and said cap;

a second pressure chamber formed by said secondary piston and said body section; and spring mechanisms for pressing each of said primary and secondary pistons in returning directions respectively disposed in said first and second pressure chambers, said spring mechanism disposed in said first pressure chamber including a substantially cylindrical spring retainer brought into contact with a rear end surface of said secondary piston, a guide pin inserted in said spring retainer and having a portion engaged with said primary piston and an opposite head portion being locked in said spring retainer, and a return spring provided to be contracted between said spring retainer and said primary piston, wherein a tip section protruded outward in a radial direction is formed in a peripheral portion of said spring retainer, and wherein said sleeve defines at least one guide groove which is formed in inner and outer peripheral surfaces of said sleeve in an axial direction for receiving and engaging said tip section and which groove also has a stopping section for contacting said tip section in a position slightly exceeding a predetermined returning limit of said primary piston, and further wherein said rear end surface of said secondary piston is provided with at least one projecting section fitting within an inner peripheral surface of said spring retainer, said projecting section having a shape fitted to the inner peripheral surface of said spring retainer and an axial height sufficient to prevent deformation of said spring retainer when force is exerted on said tip section of said spring retainer.

* * * * *